(12) United States Patent (10) Patent No.: US 7,805,006 B2
Katsuyama (45) Date of Patent: Sep. 28, 2010

(54) IMAGE PROCESSING APPARATUS

(75) Inventor: Hidekazu Katsuyama, Osaka (JP)

(73) Assignee: Keyence Corporation, Osaka-shi, Osaka (JP)

( * ) Notice: Subject to any disclaimer, the term of this patent is extended or adjusted under 35 U.S.C. 154(b) by 1027 days.

(21) Appl. No.: 11/543,776

(22) Filed: Oct. 6, 2006

(65) Prior Publication Data

US 2007/0127821 A1 Jun. 7, 2007

(30) Foreign Application Priority Data

Oct. 11, 2005 (JP) ............................ P.2005-296195

(51) Int. Cl.
*G06K 9/48* (2006.01)
(52) U.S. Cl. ...................... 382/199; 356/511; 356/601; 382/103; 382/242; 382/266
(58) Field of Classification Search ................ 356/511, 356/601, 613; 382/145, 199, 242, 266, 316
See application file for complete search history.

(56) References Cited

U.S. PATENT DOCUMENTS

| | | | | |
|---|---|---|---|---|
| 5,940,527 A | * | 8/1999 | Takeo | 382/132 |
| 6,272,233 B1 | * | 8/2001 | Takeo | 382/128 |
| 6,654,497 B1 | * | 11/2003 | Kondo et al. | 382/199 |
| 6,728,464 B1 | * | 4/2004 | Waldmann | 385/147 |
| 7,120,286 B2 | * | 10/2006 | Yu et al. | 382/145 |
| 7,217,923 B2 | * | 5/2007 | Sasajima et al. | 250/310 |
| 7,313,254 B2 | * | 12/2007 | Lee et al. | 382/103 |
| 7,613,355 B2 | * | 11/2009 | Hirano | 382/266 |

FOREIGN PATENT DOCUMENTS

JP 2004-145505 5/2004

* cited by examiner

*Primary Examiner*—Gregory M Desire
(74) *Attorney, Agent, or Firm*—Drinker Biddle & Reath LLP

(57) ABSTRACT

An image processing apparatus is made up of a processing target area specification section for specifying a processing target area; a circumferential direction specification section for specifying the circumferential direction of a contour circle in the processing target area; an edge detection region specification section for specifying three or more regions made different in position in the circumferential direction in the processing target area as edge detection regions based on the processing target area and the circumferential direction; an edge position identification section for identifying edge positions with respect to the radial direction based on the intensity distribution in the edge detection regions; and a contour circle determination section for determining a contour circle based on the edge positions identified relative to the edge detection regions.

16 Claims, 18 Drawing Sheets

IMAGE PROCESSING APPARATUS

TECHNICAL FIELD

The present disclosure relates to an image processing apparatus and an image processing method and more particularly to improvement of an image processing apparatus for detecting a circle as the contours of a subject based on image data provided by image acquiring unit.

RELATED ART

Generally, image processing of extracting the contours of a subject from a workpiece photograph image is performed in automatic identification of workpieces (test objects), etc. For example, a circle as the contours of a subject (which will be hereinafter referred to as contour circle) is detected by edge detection based on a photograph image. To detect the contour circle, edges are detected in processing units of a plurality of rectangular regions specified by the user about image data provided by image acquiring unit, and the contour circle is determined.

FIG. 18 is a drawing to show an operation example in image processing in a related art and shows a plurality of rectangular regions 103 specified by the user in an image region 101 of a photograph image about a subject 102. Each of the rectangular regions 103 as processing units in edge detection is a vertically oriented rectangle and edges are detected with the length direction as the edge detection direction. In the edge detection, the user needs to specify the position of each rectangular region 103 and edge detection orientation 104, namely, the orientation of the rectangular region 103, and the edge position is determined with respect to the edge detection direction specified by the user. To determine a contour circle from the edge position determination result, the edge positions need to be determined about at least three rectangular regions 103 different in position. In the example, the rectangular regions 103 are placed at three points on the circumference and the orientation of each rectangular region 103 is specified so that the edge detection orientation 104 is oriented to the center of the contour circle.

To determine the contour circle based on the edge positions determined about each rectangular region 103 placed at three points on the circumference, if even one rectangular region with a large shift in the edge positions caused by noise, etc., exists, a large shift occurs in the center position and the radius and thus the contour circle detection result does not become stable; this is a problem. To stabilize the contour circle detection result for enhancing the detection accuracy, if an attempt is made to place a larger number of rectangular regions for determining a contour circle, the user must specify the positions and orientations about a larger number of rectangular regions, resulting in more intricate operation entry to specify the positions and orientations; this is a problem.

An art of specifying a rectangular window as a processing target area and detecting edges in processing units of a plurality of rectangular regions in the window is proposed. (For example, refer to Japanese Patent Unexamined Publication No. 2004-145505, which is hereinafter referred as patent document 1.) The image processing apparatus described in patent document 1 simply detects the position of an edge point as one portion of the contours of a subject or complements a space between edge points by a curve about adjacent rectangular regions. Therefore, it is not intended for determining an appropriate contour circle based on a plurality of edge positions detected for each rectangular region.

The image processing in the related art involves the above-described problem, namely, the contour circle detection result does not become stable because of the effect of noise, etc. To stabilize the contour circle detection result for enhancing the detection accuracy as for the rectangular regions as the processing units of edge detection, if an attempt is made to place a larger number of rectangular regions for determining a contour circle, the user must specify the positions and orientations about a larger number of rectangular regions, resulting in more intricate operation entry to specify the positions and orientations; this is the above-described problem.

SUMMARY

Embodiments of the present invention provide an image processing apparatus and an image processing method for improving the operability when detecting the contours of a subject based on image data provided by image acquiring unit. Particularly, Embodiments of the present invention provide an image processing apparatus that can detect a circle as the contours of a subject appropriately and stably. Embodiments of the present invention also provide an image processing apparatus that can determine a circle as the contours correctly even if distortion occurs in the photograph image of a subject because of the effect of disturbance.

According to a first aspect of one or more embodiments of the invention, an image processing apparatus for detecting a contour circle as contours of a subject based on image data provided by an image acquiring unit, includes: a processing target area specification section for specifying a processing target area; a circumferential direction specification section for specifying the circumferential direction of the contour circle in the processing target area; an edge detection region specification section for specifying three or more regions made different in position in the circumferential direction in the processing target area as edge detection regions based on the processing target area and the circumferential direction; an edge position identification section for identifying edge positions with respect to the radial direction of the contour circle based on the intensity distribution in the edge detection regions; and a contour circle determination section for determining a contour circle based on the edge positions identified relative to the edge detection regions.

In the image processing apparatus, the edge positions with respect to the radial direction are identified based on the intensity distribution in the edge detection regions and a contour circle as the contours of a subject is determined based on the edge positions each identified for each of the edge detection regions. At the time, a plurality of regions made different in position in the circumferential direction of the contour circle in the processing target area are automatically specified as the edge detection regions. According to the configuration, the need for specifying the position and orientation for each edge detection processing unit is eliminated as compared with the related art, so that the operability can be improved. Particularly, even if a larger number of edge detection regions as the edge detection processing units are specified, each edge detection region is automatically specified, so that contour circle detection can be stabilized for enhancing the detection accuracy without degrading the operability. If the user is allowed to specify a rectangular region containing a portion of the contour circle as the processing target area, the contour circle can be determined appropriately regardless of whether or not the center of the contour circle is contained in the rectangular region. Thus, to specify the processing target area, the user can specify the processing target area without concern for the center position of the contour circle.

According to a second aspect of one or more embodiments of the invention, in addition to the configuration described above, the contour circle determination section is made up of a reference circle calculation section for defining a reference circle from the edge positions each for each of the edge detection regions based on a least squares method; an edge position weighting section for weighting the edge positions each for each of the edge detection regions in response to the distance from the reference circle; and a contour circle calculation section for calculating a contour circle based on the weighted edge positions. According to the configuration, the contour circle is calculated based on the edge positions weighted in response to the distance from the reference circle, so that if distortion occurs in the photograph image of the subject because of the effect of disturbance, the contour circle can be determined correctly.

According to a third aspect of one or more embodiments of the invention, in addition to the configuration described above, the edge detection region specification section specifies edge detection regions overlapping each other.

According to a fourth aspect of one or more embodiments of the invention, in addition to the configuration described above, the processing target area is a circular region containing the contour circle and each of the edge detection regions is a sector region with the center of the circular region as the vertex. According to a fifth aspect of one or more embodiments of the invention, in addition to the configuration described above, the processing target area specification section specifies an annular region sandwiched between two concentric circles different in diameter as the processing target area.

According to a sixth aspect of one or more embodiments of the invention, in addition to the configuration-described above, the. processing target area is a rectangular region not containing the center of the contour circle and containing one portion of the circumference. According to the configuration, a rectangular region containing a circular arc as a portion of the contour circle is specified as the processing target area, whereby the center position or the curvature of the circular arc can be found.

According to a seventh aspect of one or more embodiments of the invention, there is provided an image processing method for detecting a contour circle as contours of a subject based on image data provided by an image acquiring unit, the image processing method including a processing target area specification step of specifying a processing target area; a circumferential direction specification step of specifying the circumferential direction of the contour circle in the processing target area; an edge detection region specification step of specifying three or more regions made different in position in the circumferential direction in the processing target area as edge detection regions based on the processing target area and the circumferential direction; an edge position identification step of identifying edge positions with respect to the radial direction of the contour circle; and a contour circle determination step of determining a contour circle based on the edge positions identified relative to the edge detection regions.

Various implementations may include one or more the following advantages. For example, according to the image processing apparatus and the image processing method, the need for specifying the position and orientation for each edge detection processing unit is eliminated, so that the operability can be improved. Particularly, edge detection regions as the edge detection processing units are automatically specified in the processing target area, so that the contour circle as the contours of the subject can be detected appropriately and stably. The contour circle is calculated based on the edge positions weighted in response to the distance from the reference circle, so that if distortion occurs in the photograph image of the subject because of the effect of disturbance, the contour circle can be determined correctly.

Other features and advantages may be apparent from the following detailed description, the accompanying drawings and the claims.

BRIEF DESCRIPTION OF THE DRAWINGS

In the accompanying drawings:

FIG. 13 is a block diagram to show a configuration example of the main part of an image processing apparatus according to the third embodiment of the invention and shows a contour circle determination section 26a;

DETAILED DESCRIPTION

First Embodiment

Figure 1:
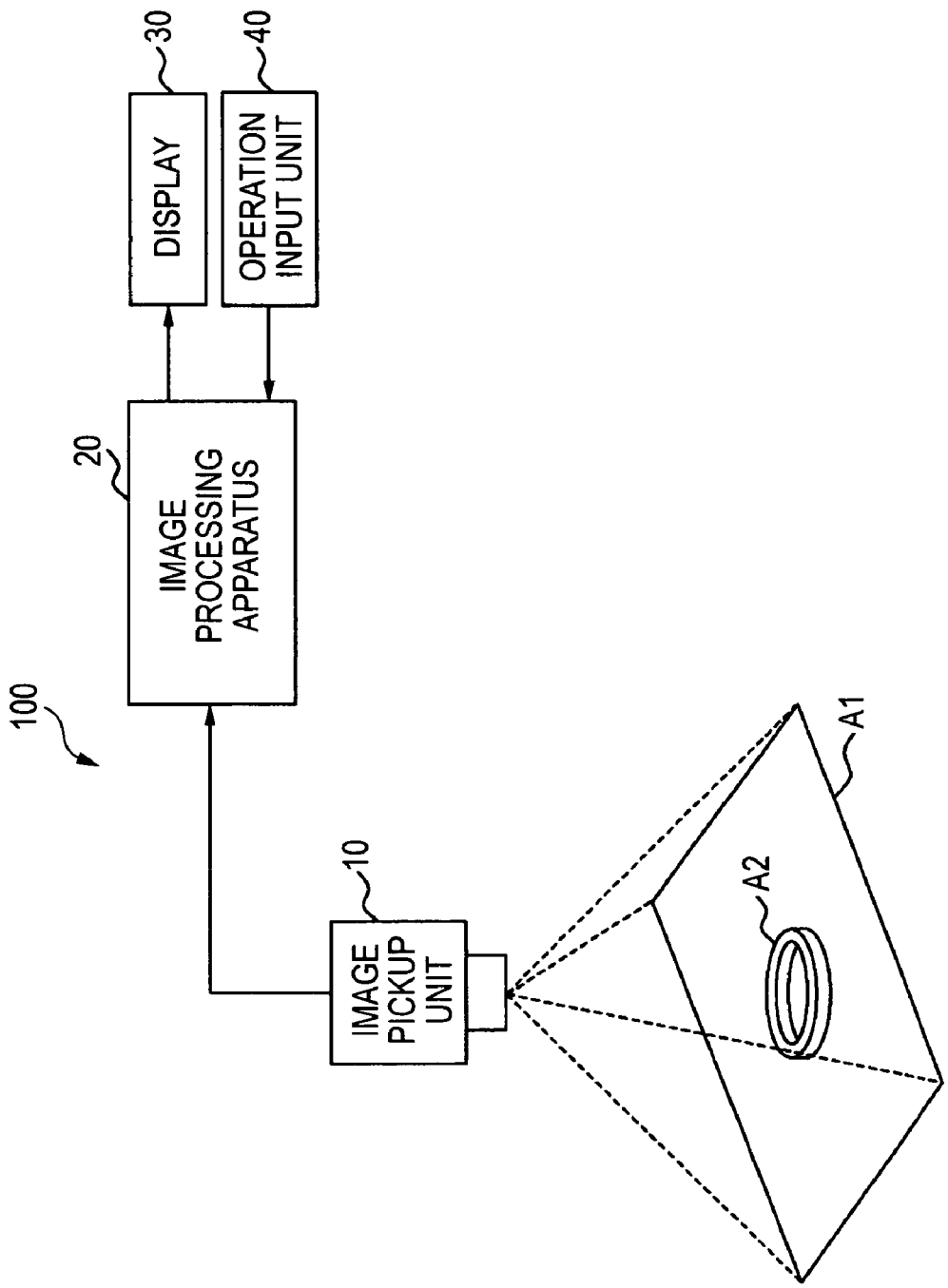
FIG. 1 is a drawing to show an example of the schematic configuration of an automatic identification system including an image processing apparatus according to a first embodiment of the invention.

FIG. 1 is a drawing to show an example of the schematic configuration of an automatic identification system 100 including an image processing apparatus according to a first embodiment of the invention. The automatic identification system 100 is an image processing system for identifying a workpiece A2 based on a photograph image and is made up of an image acquiring unit 10, an image processing apparatus 20, a display 30, and an operation input unit 40.

The image processing apparatus 20 according to the embodiment performs processing of detecting a circle as the contours of a subject (which will be hereinafter referred to as contour circle) based on a still image provided by photographing the workpiece A2. The possible workpieces A2 as test objects include structures of holes formed by a punch press, etc., as well as products of a semiconductor wafer, an O ring, a can lid, and a cap. Here, assume that an annular product is tested as the workpiece A2 and the two-dimensional position and the size of the product (workpiece A2) are identified. The circle as the detection target need not necessarily be a perfect circle and may be an ellipse.

The image acquiring unit 10 photographs the workpiece A2 in a photograph area A1 and outputs the photograph image to the image processing apparatus 20 as image data. The image acquiring unit 10 is a small-size digital camera for photographing a subject using visible light or infrared radiation and is made up of image acquiring devices such as CCDs (charge-coupled devices), for example.

The display 30 is an output unit for displaying a photograph image and various pieces of input information on a screen and is implemented as a display device of a liquid crystal display, etc., for example. The operation input unit 40 includes various operation keys and performs input processing based on operation entry of the operator.

The image processing apparatus 20 performs processing of identifying the edge position as one portion of the contours of a subject based on the image data provided by the image acquiring unit 10 and detecting a contour circle.

Figure 2:
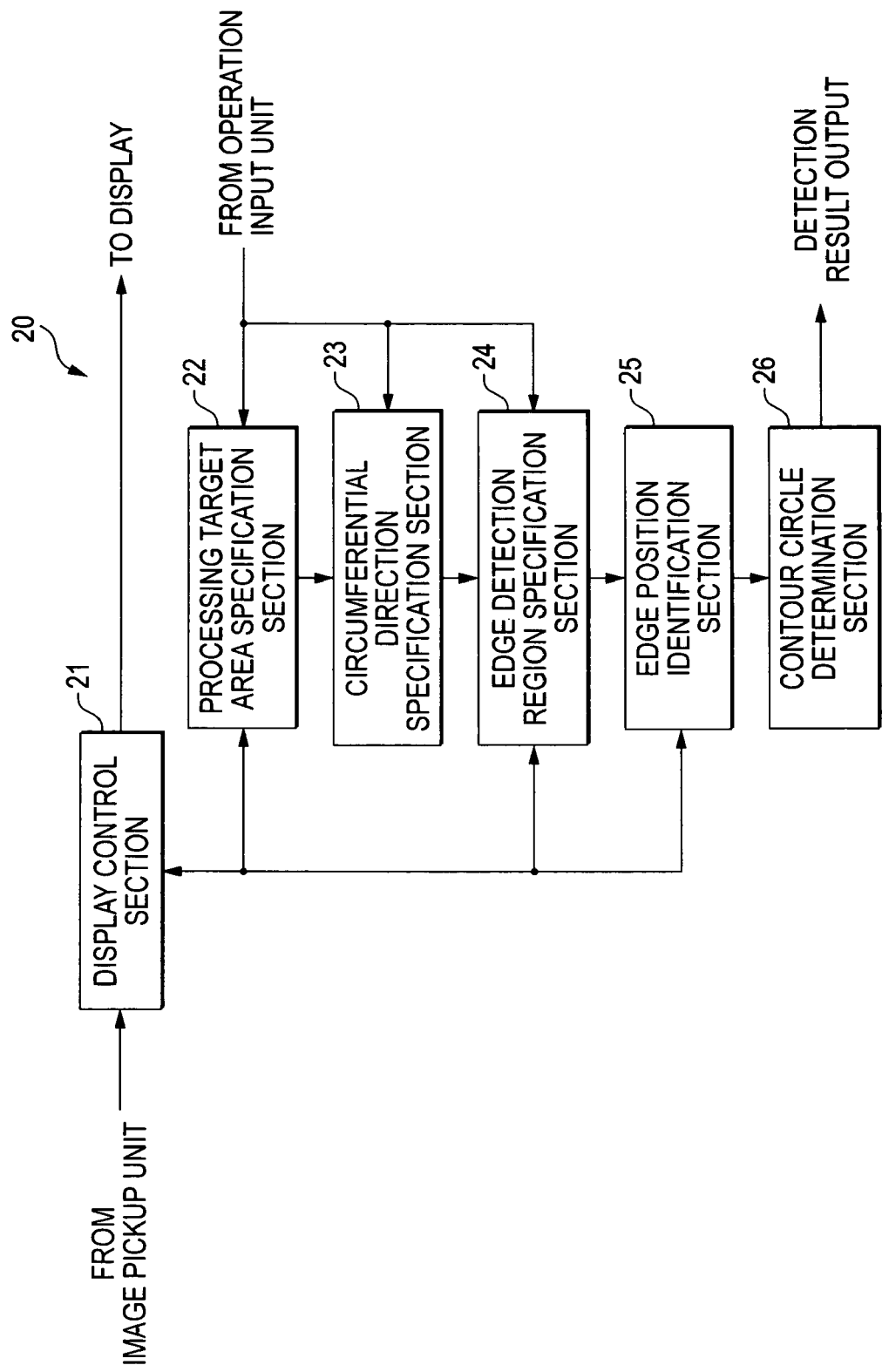
FIG. 2 is a block diagram to show the configuration of the main part of the automatic identification system in FIG. 1 and shows an example of the internal functional configuration of the image processing apparatus 20.

FIG. 2 is a block diagram to show the configuration of the main part of the automatic identification system in FIG. 1 and shows an example of the internal functional configuration of the image processing apparatus 20. The image processing apparatus 20 is made up of a display control section 21, a processing target area specification section 22, a circumferential direction specification section 23, an edge detection region specification section 24, an edge position identification section 25, and a contour circle determination section 26.

The display control section 21 performs display control of various pieces of input information concerning image data from the image acquiring unit. The processing target area specification section 22 performs the operation of specifying the processing target area to detect a contour circle based on operation entry of the operator. Here, assume that the region (circular region) surrounded by a circle as outer contours (which will be hereinafter referred to as outer contour circle) is specified as the processing target area. Assume that the circular region is specified as the region containing the contour circle to be detected. Particularly from the viewpoint of facilitating edge position identification processing, assume that a circular region having the center in the contour circle is specified.

Specifically, the photograph image of the subject is displayed on the screen of the display and an outer contour circle is superposed on the photograph image. The operator performs operation entry to specify the center position and the size of the outer contour circle based on the screen display. For example, the coordinates and the diameter of the center position are entered.

The circumferential direction specification section 23 performs the operation of specifying the circumferential direction of the contour circle in the area based on operation entry of the operator about the processing target area specified by the processing target area specification section 22. The circumferential direction specified by the circumferential direction specification section 23 defines the arrangement direction of the edge detection regions as the edge detection processing units. Here, assume that it is automatically specified as the circumferential direction of a circle because the circular region is specified as the processing target area.

The edge detection region specification section 24 performs the operation of specifying a plurality of regions partitioning the circular region specified by the processing target area specification section 22 as the edge detection regions. The edge detection regions are the edge detection processing units; here, three or more regions equal in width with respect to the circumferential direction of the contour circle are specified as the edge detection regions. The edge detection regions are automatically placed as they differ in circumferential position in the circular region. The edge detection regions are spaced from each other. Alternatively, they may be placed overlapping each other from the viewpoint of enhancing the detection accuracy of the contour circle.

Specifically, a sector region with the center of the circular region as the processing target area as the vertex is specified as an edge detection region. For example, the vertical angle (center angle) is specified, thereby defining the width of the sector region as the edge detection region with respect to the circumferential direction. Alternatively, the number of pixels contained in the sector region may be specified for defining the size of the sector region. The size of the sector region as the edge detection region, the spacing between the adjacent sector regions, and the number of the sector regions placed in the circular region are specified based on operation entry of the operator.

Here, the edge detection region as the edge detection processing unit thus specified is referred to as segment. From the viewpoint of decreasing the load in the edge detection processing, namely, edge position identification processing, assume that the annular region sandwiched between two concentric circles different in diameter (here, the outer circle is referred to as outer contour circle and the inner circle is referred to as inner contour circle) is specified as the processing target region. A segment is formed as a portion of the sector region in the annular region. Assume that the circle contained in the contour circle is specified as the inner contour circle. The segment size may be selectively specified by the operator from among a plurality of default sizes like "large", "medium," and "small" in addition to direct specification of the size of the vertical angle and the number of pixels.

The edge position identification section 25 performs processing of identifying the edge position with respect to the radial direction of the contour circle based on the intensity distribution in the segment. For example, for each pixel in the segment, the intensity levels are added in the circumferential direction and the edge strength with respect to the radial direction vertical to the circumferential direction is found based on the intensity data after the addition processing. The addition processing in the circumferential direction concerning the vertex of the sector region is filtering to enhance the contours of the subject for making the noise component inconspicuous and is referred to as projection of intensity data. The edge enhancement is the change rate of the intensity level concerning the adjacent pixel and the edge positions as the contours of the subject are identified based on the edge strength distribution with respect to the radial direction of the sector region.

Here, assume that edge strength analysis processing is performed from the outside to the inside with respect to the radial direction of the sector region. The first peak position of the edge strengths exceeding a predetermined threshold value is defined as the edge position. Accordingly, if the contours of the subject exist in the outside and the inside, the outer contours can be found. Number N may be specified for detecting the edge position of the Nth edge existing with respect to the detection direction of edge detection. The edge strength analysis processing may be performed from the inside to the outside with respect to the radial direction of the sector region. In so doing, if the contours of the subject exist in the outside and the inside, the inner contours can be found appropriately. In this case, the inner contour circle defining the inner boundary line of the segment is specified, whereby the effect of noise inside the inner contour circle can be removed.

The contour circle determination section 26 performs processing of determining the contour circle based on the edge positions each identified for each segment. For example, a least squares method can be used to find the optimum circle fitted to the edge positions each for each segment as the contour circle. Specifically, the center position and the size of the contour circle are calculated. The detection result of the contour circle is output to the display and other machines.

Figure 3:
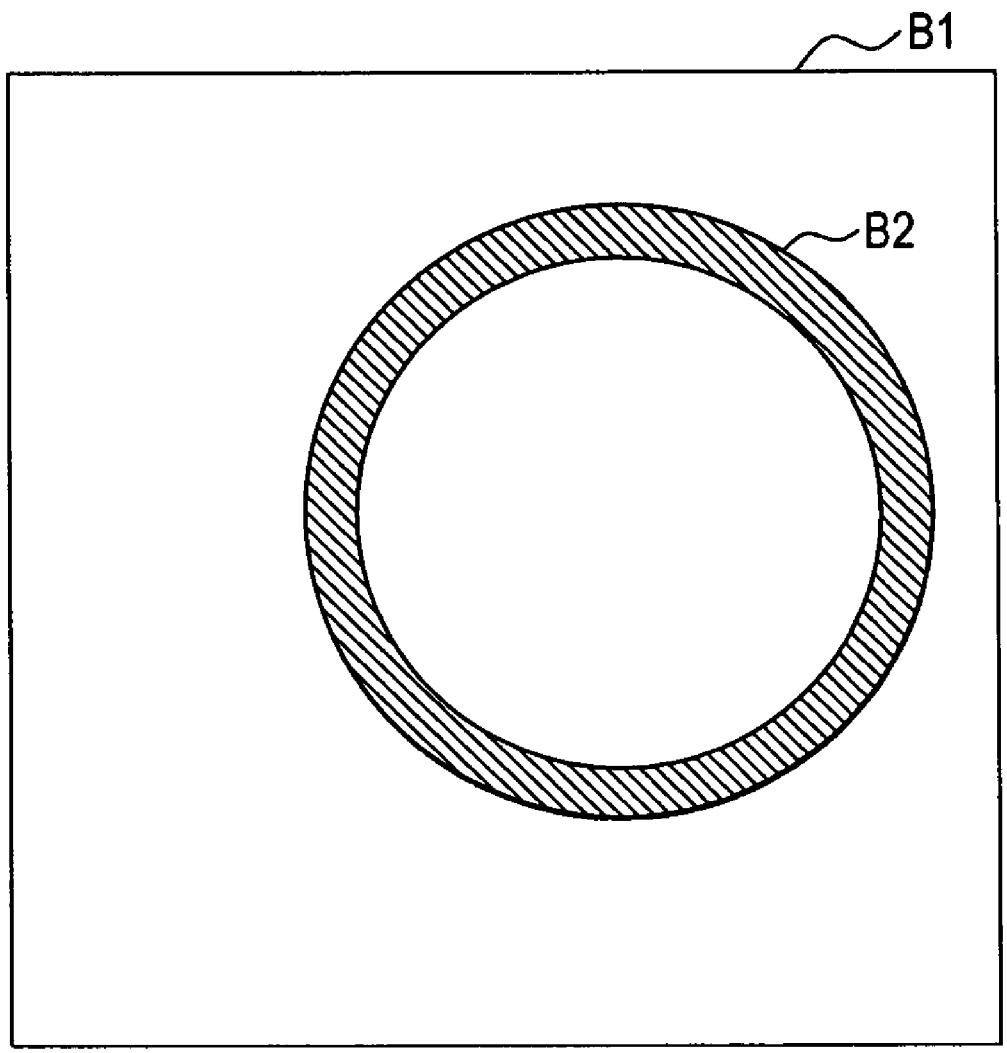
FIG. 3 is a drawing to show an example of a photograph image in the automatic identification system in FIG. 1.

FIG. 3 is a drawing to show an example of a photograph image B1 in the automatic identification system in FIG. 1. The FIG. 3 is a drawing to show an example of a photograph image in the automatic identification system in FIG. 1 is a still image provided by photographing the work piece A2 from above. A ring like subject B2 corresponding to the workpiece A2 is shown as light and shade.

Figure 4:
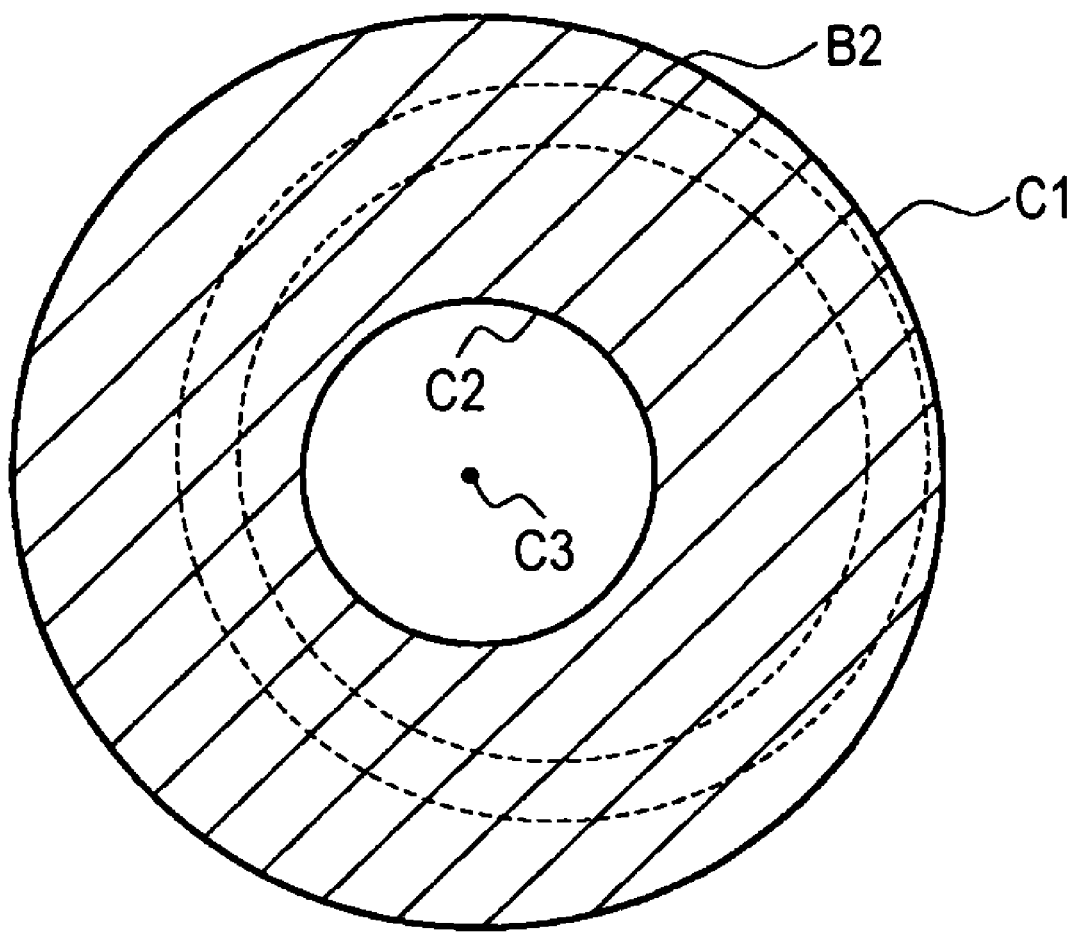
FIG. 4 is a drawing to show an example of a processing target area specified about the photograph image in FIG. 3 and shows an annular region sandwiched between an outer contour circle C1 and an inner contour circle C2.

FIG. 4 is a drawing to show an example of a processing target area specified about the photograph image in FIG. 3 and shows an annular region sandwiched between an outer contour circle C1 and an inner contour circle C2. The annular region as the processing target area is a ring-like region having a center C3 of the outer contour circle C1 and the inner contour circle C2 as the center and the position and the size of the region are specified matching those of the subject B2 in the screen.

Figure 5:
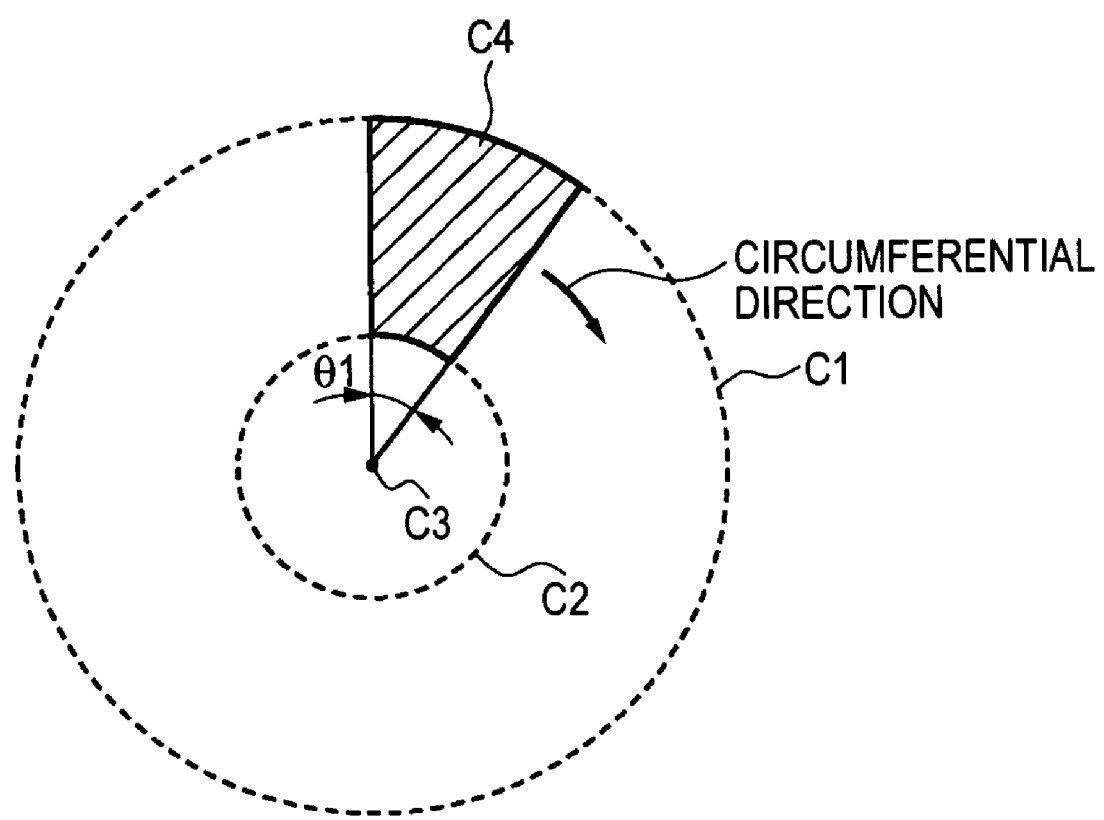
FIG. 5 is a drawing to show an example of a segment specified about the processing target area in FIG. 4 and shows a sector region C4 sandwiched between the outer contour circle C1 and the inner contour circle C2.

FIG. 5 is a drawing to show an example of a segment specified about the processing target area in FIG. 4 and shows a sector region C4 sandwiched between the outer contour circle C1 and the inner contour circle C2. The sector region C4 is a portion of a circular arc region with the center C3 as the vertex. A vertical angle θ1 of the sector region C4 is specified in the range of 0°<θ1≦120°. To place n sector regions C4 (where n is an integer of three or more) in the circumferential direction, letting the spacing between the adjacent sector regions C4, namely, the angle between the regions be θ2, the angle θ2 is specified in the range of θ1<θ2≦360°/n.

Here, if the angle θ2 is specified in the range of 0°<θ2<θ1, portions of the adjacent sector regions C4 can be placed overlapping each other. In this case, the vertical angle θ1 can be specified in the range of 120°<θ1≦360°. In so doing, the segments are overlapped, whereby the number of segments placed in the processing target area increases, so that the detection accuracy of the contour circle cab be enhanced.

Figure 6:
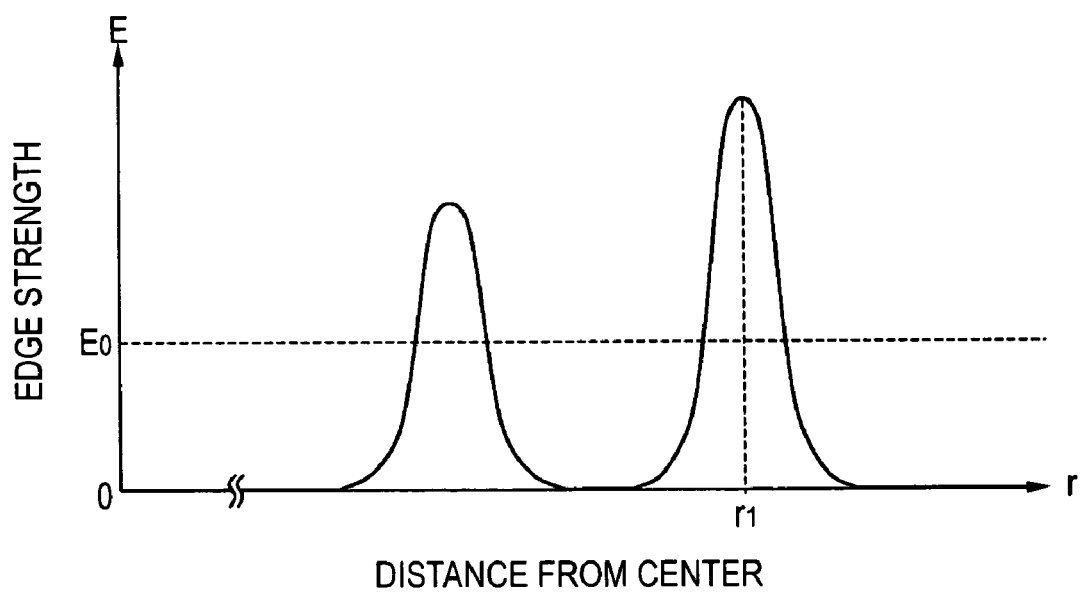
FIG. 6 is a drawing to show an example of edge detection executed for each segment in FIG. 5 and shows edge strength E with respect to the radial direction for each distance r from a center C3.

FIG. 6 is a drawing to show an example of edge detection executed for each segment in FIG. 5 and shows edge strength E with respect to the radial direction found about the sector region C4 for each distance r from the center C3. The edge strength E is found from the intensity data in the sector region C4 about the photograph image in FIG. 3.

Since the edge strength E corresponds to the change amount of the intensity level of the adjacent pixel, the edge strength E also grows where the intensity level largely changes. In the example, the subject is shaped like a ring and thus two peaks associated with the outer and inner contours are detected. The edge position is defined by determining the position where the strength becomes the maximum (peak position) about the edge strength E exceeding a threshold value Eo. Here, analysis processing of the edge strength E is performed from the outside to the inside with respect to the radial direction of the sector region C4 and therefore an edge position r1 as the outer contour position of the subject is obtained as the identification result.

Figure 7:
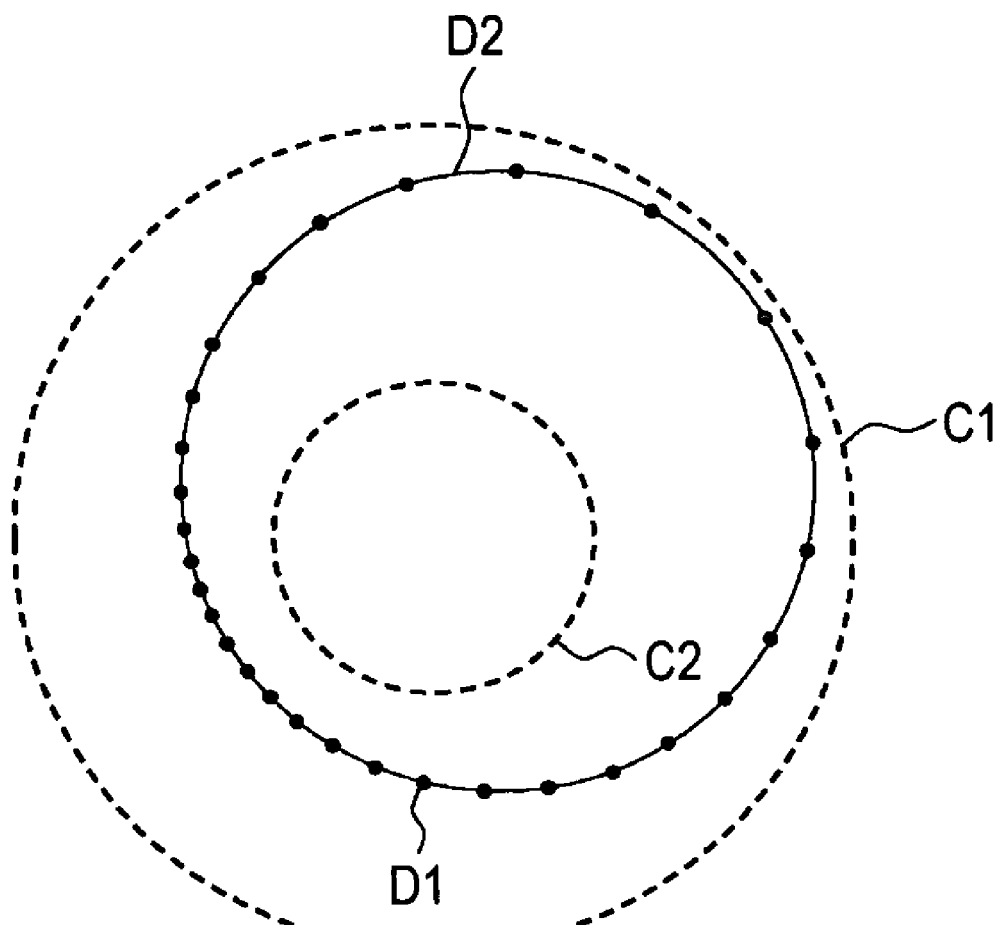
FIG. 7 is a drawing to show an example of the contour circle detected about the photograph image in FIG. 3 and shows detection points D1 and a contour circle D2 defined from the detection points D1.

FIG. 7 is a drawing to show an example of the contour circle detected about the photograph image in FIG. 3 and shows a large number of detection points D1 indicating the edge positions each identified for each segment and a contour circle D2 defined from the detection points D1. The contour circle D2 is thus determined from a large number of detection points D1, whereby the effect caused by fluctuation of the detection points D1 caused by noise, etc., can be suppressed and stable circle detection can be conducted.

Figure 8:
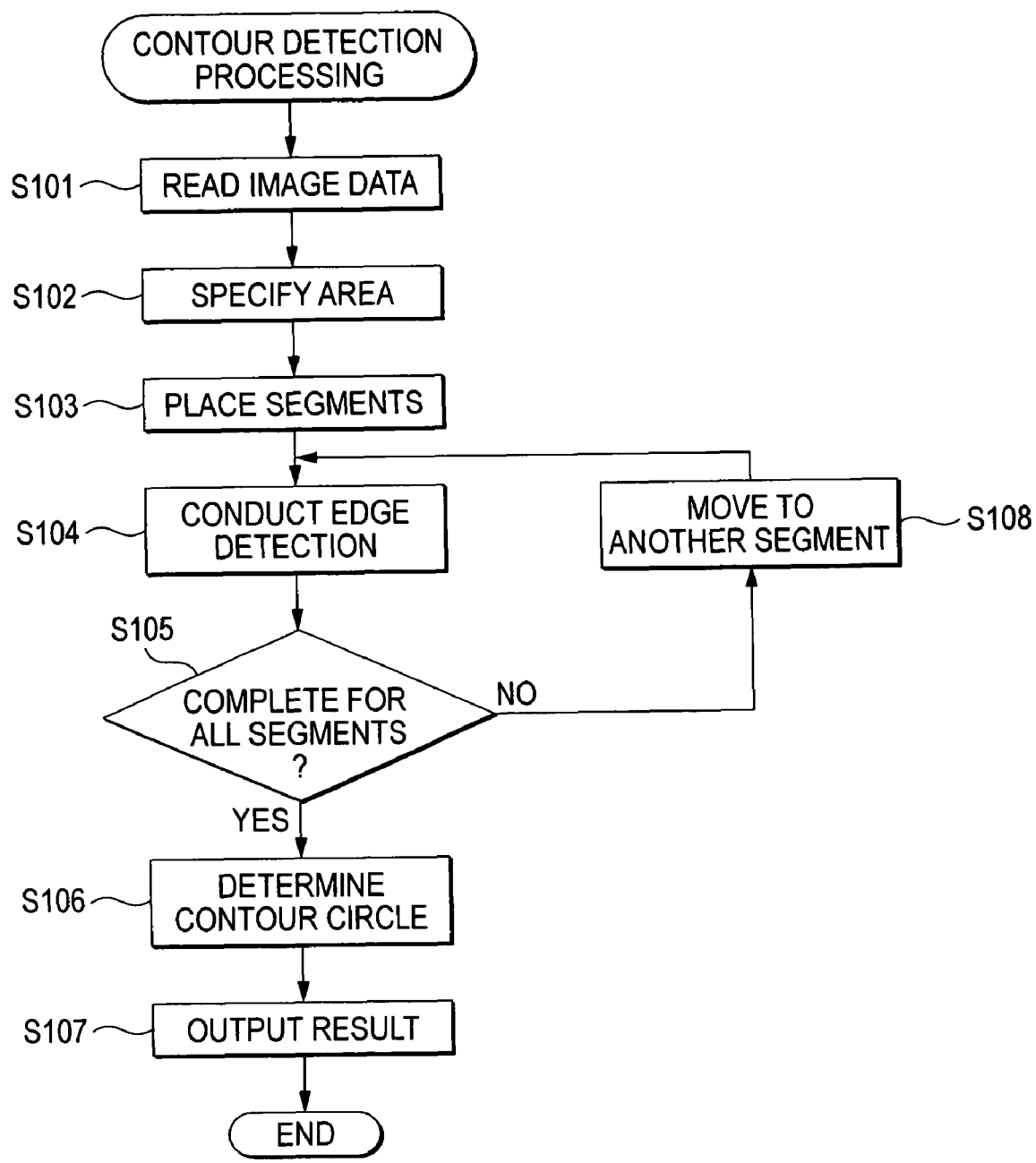
FIG. 8 is a flowchart to show an example of contour detection processing of the image processing apparatus in FIG. 2.

FIG. 8 is a flowchart to show an example of the contour detection processing of the image processing apparatus in FIG. 2. First, the display control section 21 reads image data from the image acquiring unit based on operation entry of the operator and displays a photograph image on the display (step S101). When the photograph image is displayed, the processing target area specification section 22 specifies the annular region as the processing target area (step S102).

Next, the edge detection region specification section 24 places segments in the annular region (step S103) and the edge position identification section 25 executes edge detection about each of the segments placed in the annular region (step S104). The step S104 (edge position detection) is repeated while the target segment is moved to another segment until the edge position detection is complete for all segments (steps S105 and S108).

Upon completion of the edge detection for all segments, the contour circle determination section 26 determines the contour circle based on the edge positions each detected for each segment and outputs the contour circle as the detection result (steps S106 and S107).

According to the embodiment, the need for specifying the position and orientation for each edge detection processing unit is eliminated as compared with the contour circle detection in the related art, so that the operability for specifying the edge detection processing unit can be improved. Particularly, even if a larger number of edge detection regions as the edge detection processing units are specified, each edge detection region is automatically specified, so that contour circle detection can be stabilized for enhancing the detection accuracy without degrading the operability.

Second Embodiment

In the description of the first embodiment, an annular region containing a contour circle is specified as the processing target area by way of example. In contrast, in a second embodiment of the invention, the case where a rectangular region containing a portion of the circumference of a contour circle is specified as the processing target area will be discussed.

Figure 9:
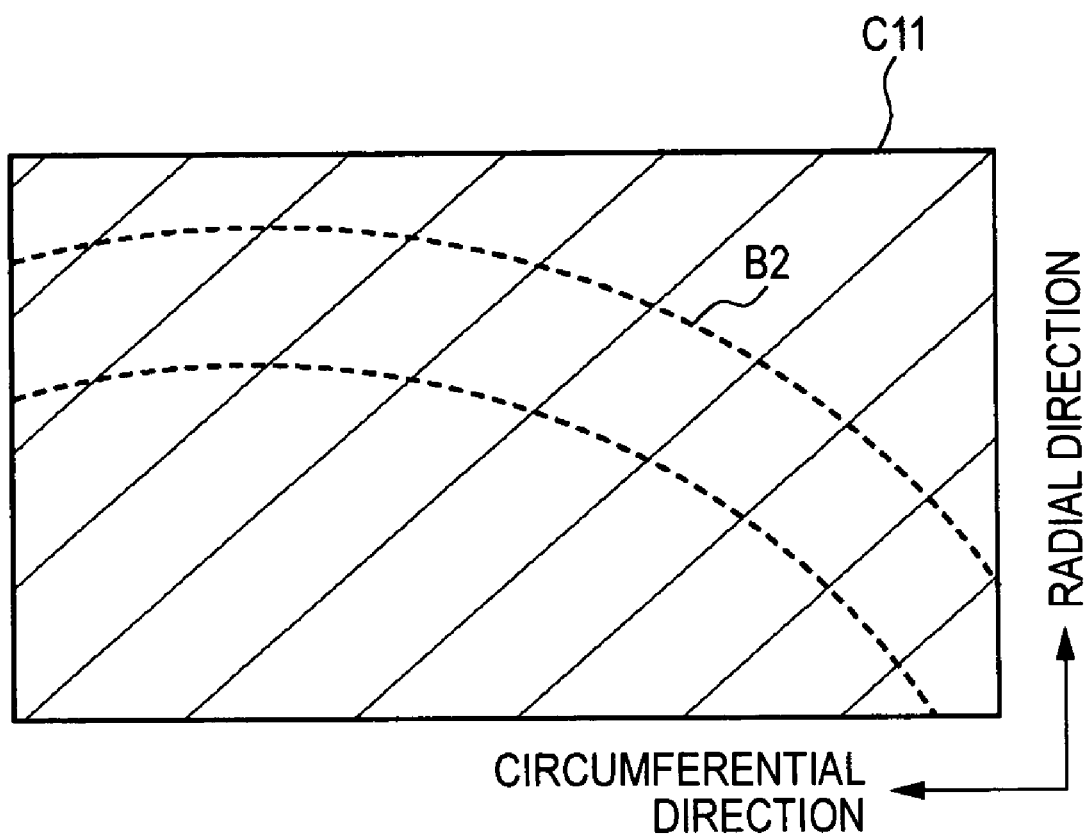
FIG. 9 is a drawing to show an example of the operation of an image processing apparatus according to a second embodiment of the invention and shows the case where a rectangular region C11 is specified as a processing target area.

FIG. 9 is a drawing to show an example of the operation of an image processing apparatus according to the second embodiment of the invention and shows the case where a rectangular region C11 containing a portion of the circumference of the contours of a subject B2 is specified as the processing target area. The rectangular region C11 is specified as a rectangular region not containing the center of a contour circle. For example, a rectangular region with the direction along the contours of the subject B2 as the length direction is specified as the rectangular region C11.

Specifically, the operator specifies the vertex of rectangular region C11, whereby the position and the size of the rectangular region C11 in the screen are specified.

Figure 10:
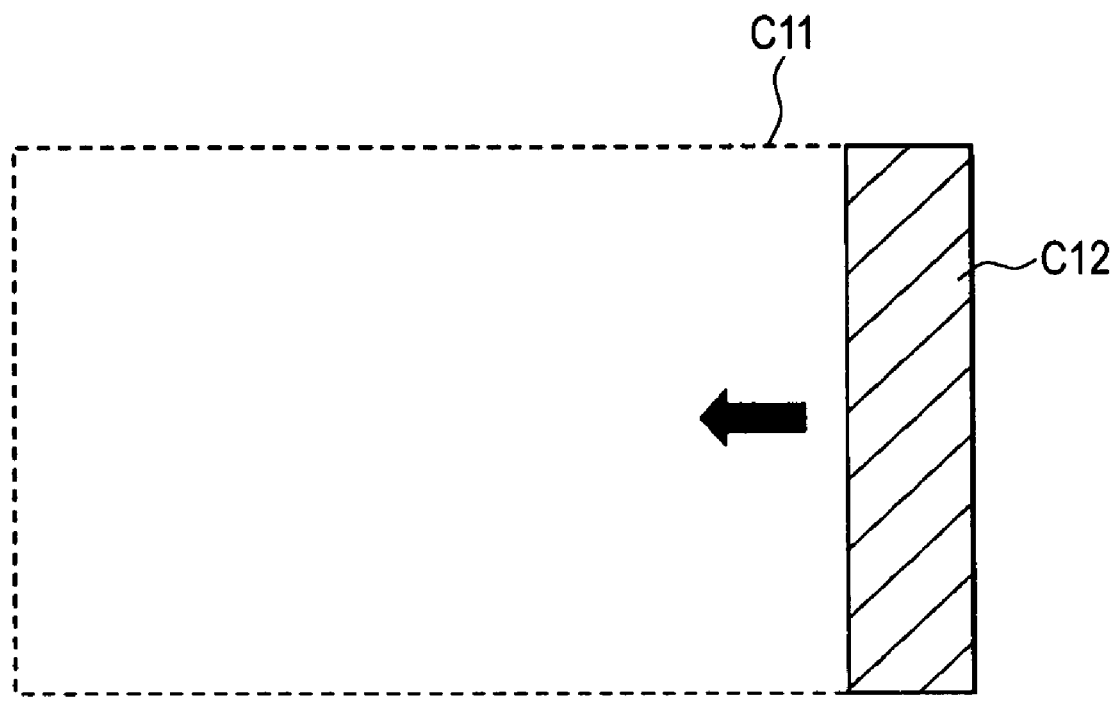
FIG. 10 is a drawing to show an example of a segment specified about the processing target area in FIG. 9 and shows a rectangular region C12 parallel to one side of the rectangular region C11.

FIG. 10 is a drawing to show an example of a segment specified about the processing target area in FIG. 9 and shows a rectangular region C12 parallel to one side of the rectangular region C11. The rectangular region C12 as the segment is a rectangular region with the radial direction of the contour circle as the length direction, and a large number of rectangular regions C12 different in position in the circumferential direction are placed in the rectangular region C11. Here, assume that the rectangular regions C12 are regions equal in width with respect to the circumferential direction of the contour circle.

The width of each rectangular regionC12 with respect to the circumferential direction and the spacing (pitch) between the adjacent rectangular regions C12 are specified based on operation entry of the operator. Here, if the pitch for placing the rectangular regions C12 is set smaller than the width of the region, portions of the adjacent rectangular regions C12 can be placed overlapping each other.

Figure 11:
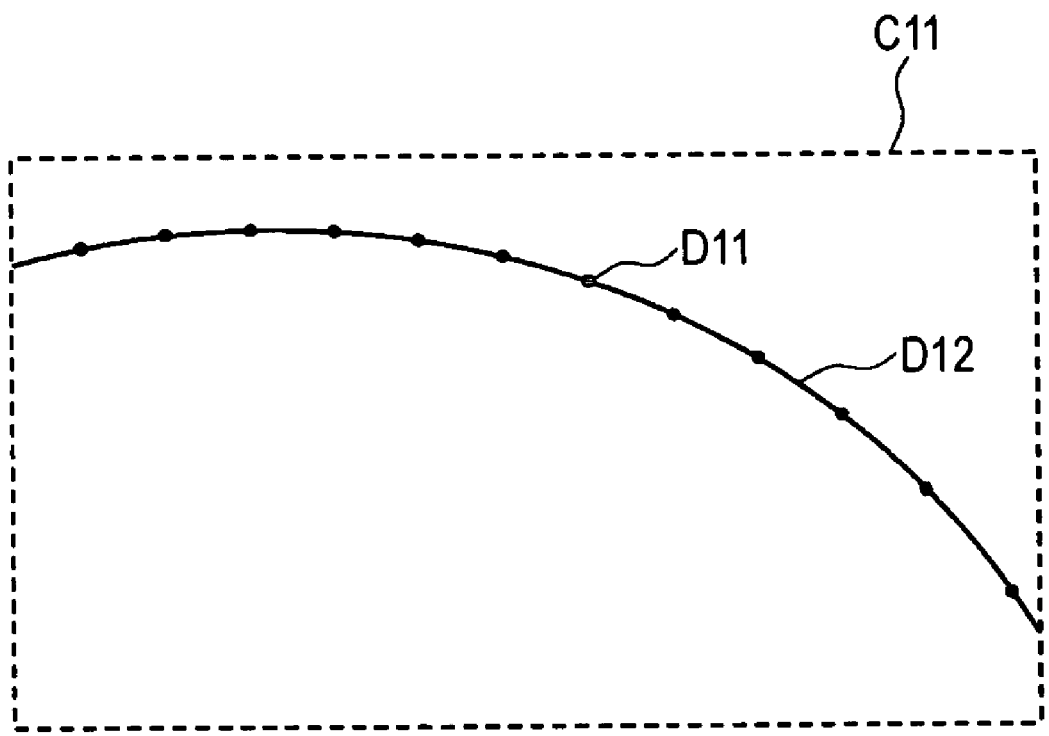
FIG. 11 is a drawing to show an example of the contour circle detected about the processing target area in FIG. 9 and shows detection points D11 and a contour circle D12 defined from the detection points D11.

FIG. 11 is a drawing to show an example of the contour circle detected about the processing target area in FIG. 9 and shows a large number of detection points D11 indicating the edge positions each identified for each segment and a contour circle D12 defined from the detection points D11. The contour circle D12 is thus determined from a large number of detection points D11, whereby the effect caused by fluctuation of the detection points D11 caused by noise, etc., can be suppressed and stable circle detection can be conducted. Particularly, to position a circular workpiece such as a semiconductor wafer, etc., if a portion of the contours is specified as the processing target area, an appropriate contour circle can be detected stably. Specifically, the center position and the curvature of the contour circle are found as the feature amounts of the contour circle.

Figure 12:
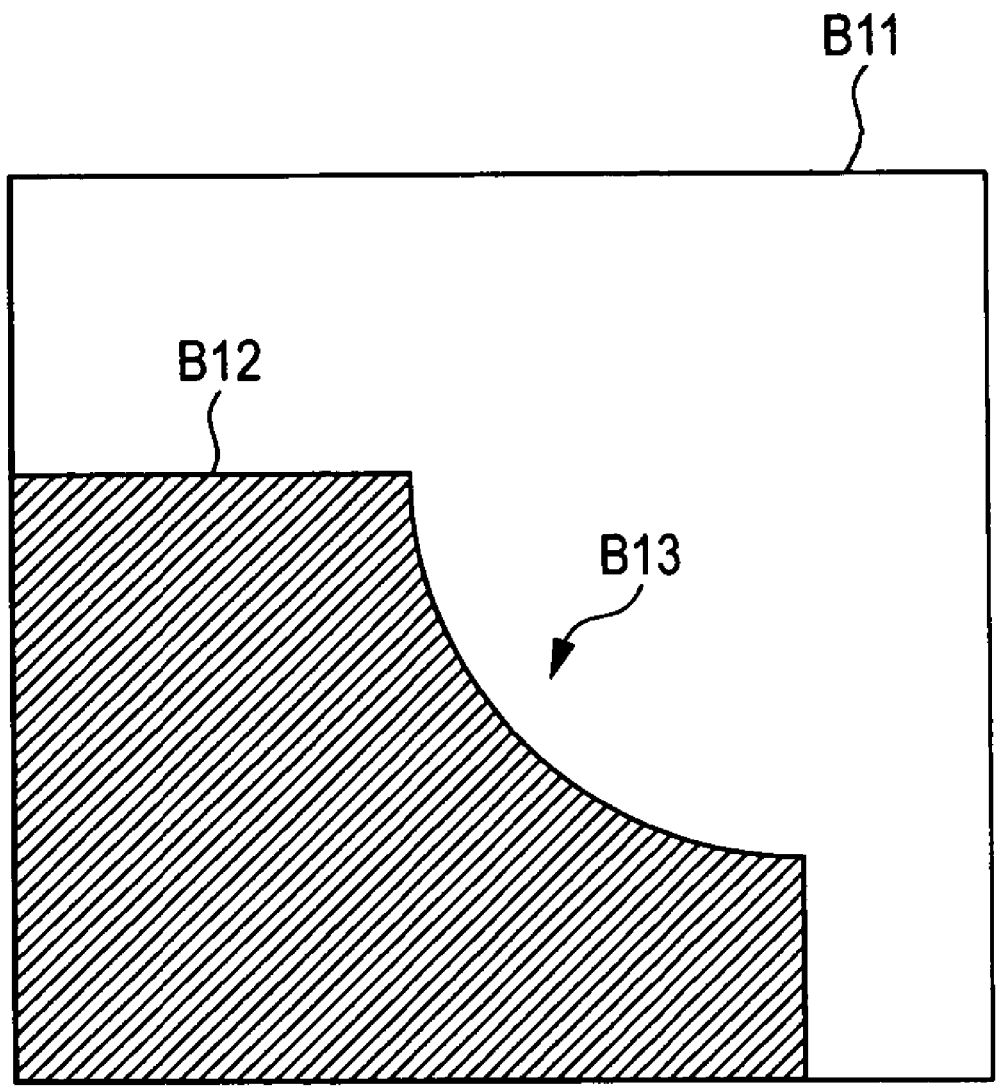
FIG. 12 is a drawing to show another example of a subject in a photograph image.

FIG. 12 is a drawing to show another example of a subject in a photograph image B11. In the photograph image B11, the contours of a subject B12 having a circular notch B3 are shown as light and shade. The notch B13 of the subject B12 corresponds to a notch formed on a work piece by metal working, for example. The invention can also be applied to automatic identification of the center position and the size of the notch B13. In addition, the invention can also be applied to outer diameter measurement of an O ring, positioning of holes formed by a punch press, and positioning and outer diameter measurement of a can lid and a cap.

According to the embodiment, even if a larger number of edge detection regions C12 as the edge detection processing units are specified, each edge detection region C12 is automatically specified, so that contour circle detection can be stabilized for enhancing the detection accuracy without degrading the operability. Particularly, an appropriate contour circle can be determined regardless of whether or not the processing target area contains the center of the contour circle. Thus, to specify the rectangular region C11 as the processing target area, the user can specify the rectangular region C11 without concern for the center position of the contour circle.

Third Embodiment

In the description of the first and second embodiments, the contour circle is determined based on the edge positions each identified for each segment by way of example. In contrast, in a third embodiment of the invention, the case where an abnormal point is excluded from each detection point indicating the edge position for each segment to calculate a contour circle will be discussed.

Figure 13:
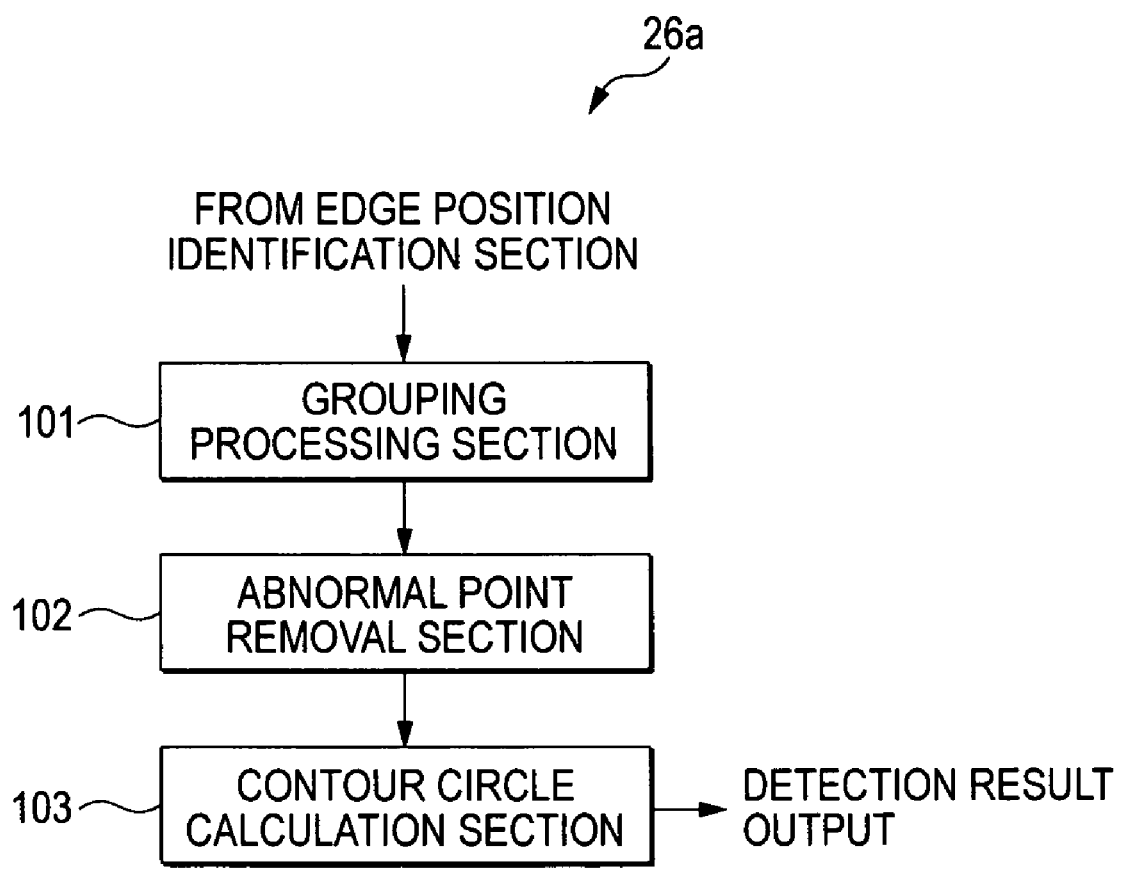

FIG. 13 is a block diagram to show a configuration example of the main part of an image processing apparatus according to the third embodiment of the invention and shows a contour circle determination section 26a. The contour circle determination section 26a is made up of a grouping processing section 101, an abnormal point removal section 102, and a contour circle calculation section 103. Generally, when a least squares method, etc., is used to determine a contour circle from a large number of detection points, if a point largely deviating from the contour circle of the detection target (called abnormal point) is contained in the detection points, an appropriate contour circle cannot be obtained because of the effect of the abnormal point. Therefore, it is desirable that such an abnormal point should be excluded from the operands to calculate the contour circle.

The grouping processing section 101 performs processing of grouping the detection points each for each segment. Specifically, for each detection point, the distance from the end of the segment with respect to the radial direction is examined and the difference between the adjacent detection points is found. The detection points are grouped based on the distance difference information.

The abnormal point removal section 102 examines the number of the detection points belonging to each group and removes the abnormal point (group) based on the number of the detection points. The contour circle calculation section 103 calculates the contour circle based on the detection point group after the abnormal point removal.

Figure 14:
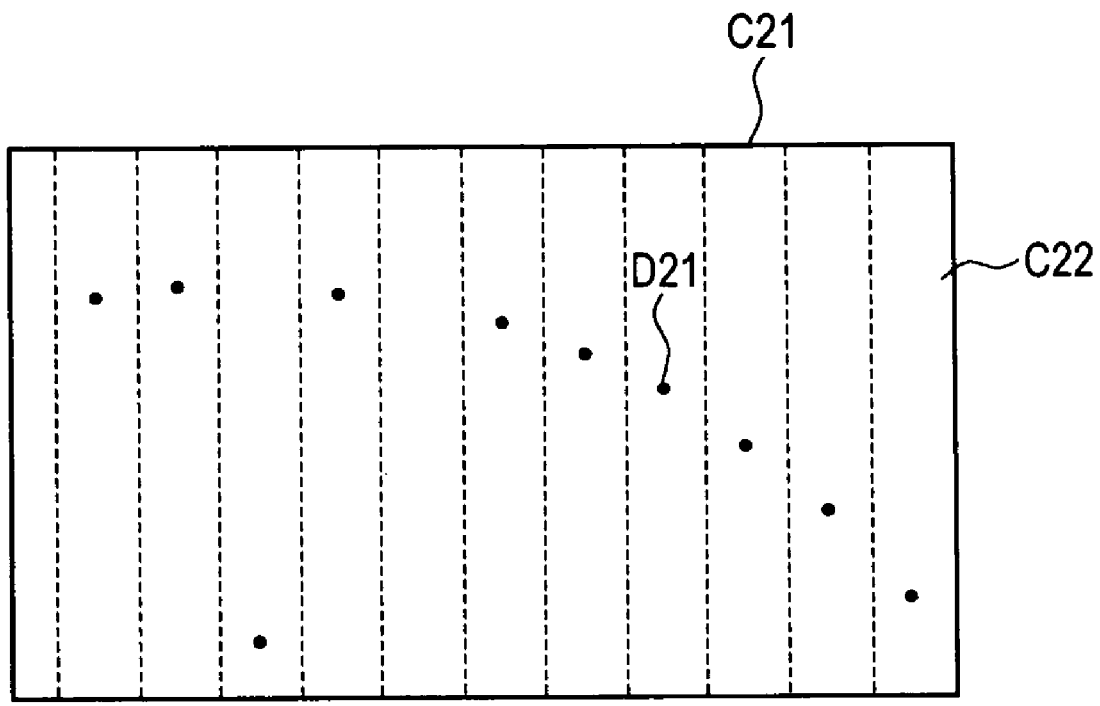
FIG. 14 is a drawing to show detection points D21 each identified for each segment in a rectangular region C21 as the processing target area.

FIG. 14 is a drawing to show detection points D21 each identified for each segment in a rectangular region C21 as the processing target area. In the example, an abnormal point is contained in the detection points D21 each for each rectangular region C22 as the segment.

According to the configuration, an abnormal point is excluded from the detection point group to calculate a contour circle, so that if a large shift occurs in the detection point position because of the effect of noise, etc., an appropriate contour circle can be detected.

Fourth Embodiment

In the description of the third embodiment, an abnormal point is excluded from the detection points each for each segment to calculate a contour circle by way of example. In contrast, in a fourth embodiment of the invention, the case where each detection point after abnormal point removal is weighted to calculate a contour circle will be discussed.

Figure 15:
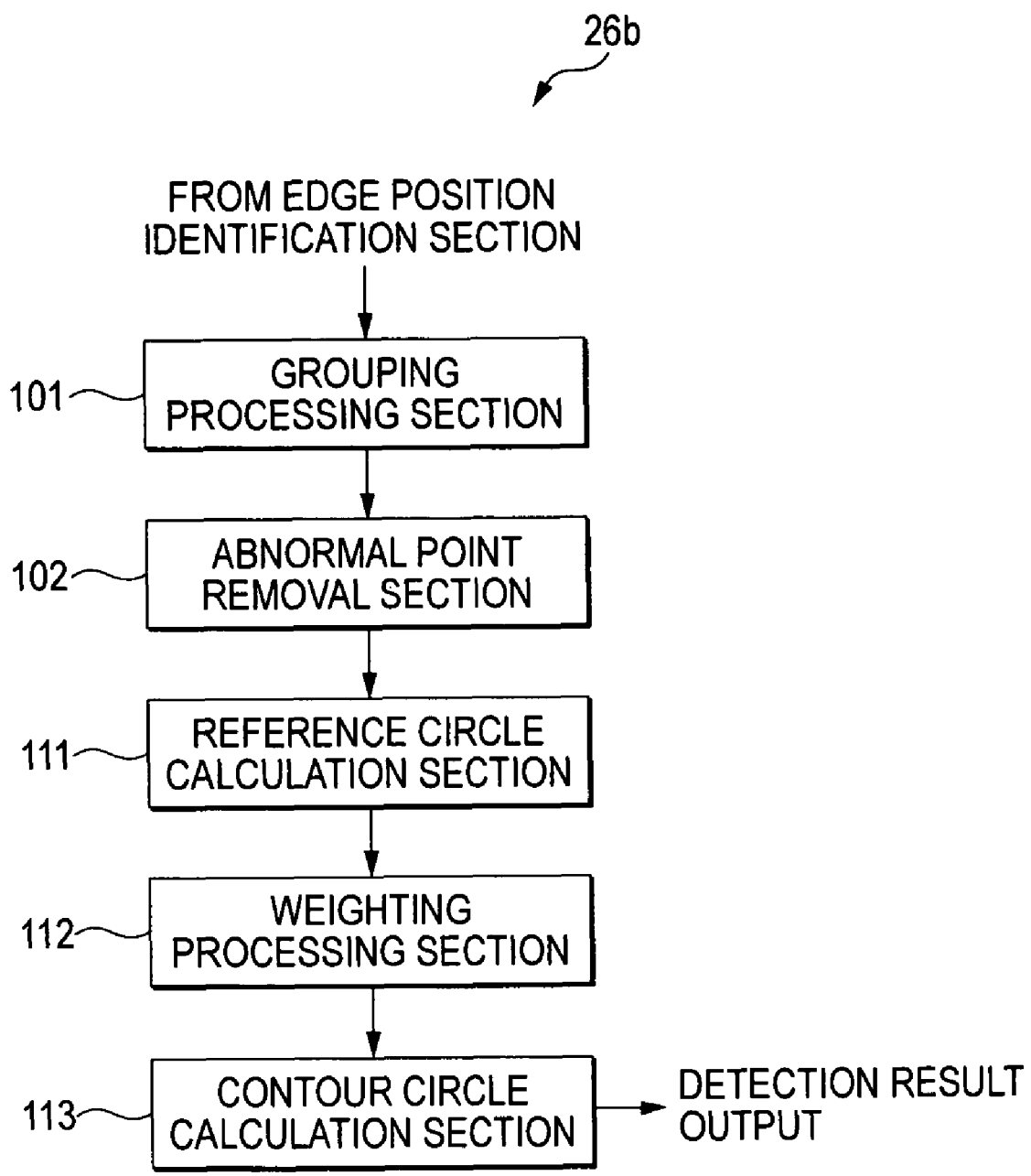
FIG. 15 is a block diagram to show a configuration example of the main part of an image processing apparatus according to a fourth embodiment of the invention and shows a contour circle determination section 26b.

FIG. 15 is a block diagram to show a configuration example of the main part of an image processing apparatus according to the fourth embodiment of the invention and shows a contour circle determination section 26b. The contour circle determination section 26b is made up of a grouping processing section 101, an abnormal point removal section 102, a reference circle calculation section 111, a weighting processing section 112, and a contour circle calculation section 113. Generally, when a least squares method, etc., is used to determine a contour circle from a large number of detection points, if distortion occurs in the contours of a subject due to the effect of disturbance, etc., an appropriate contour circle cannot be obtained. Therefore, it is desirable that the effect of distortion should be suppressed using a robust estimation method when the contour circle is calculated.

The reference circle calculation section 111 defines a reference circle from the detection points indicating the edge positions each for each segment using the least squares method. The reference circle is a circle used as the reference for determining a shift from the contour circle of the detection target for each detection point. The weighting processing section 112 performs processing of weighting the detection points each for each segment in response to the distance from the reference circle.

Specifically, the distance from the reference circle is examined for each detection point and standard deviation a concerning the detection point group is found. The detection point with the distance from the reference circle being equal to or greater than Aσ (where A is a coefficient) is weighted as weight zero. This means that the detection point with the distance from the reference circle being equal to or greater than Aσ is excluded from the detection point group. The contour circle calculation section 113 calculates a contour circle based on the post-weighted detection point group. Here, performing statistical processing as the effect of the detection values largely deviating from the reference value (exception values) is thus suppressed is called robust estimation.

Figure 16:
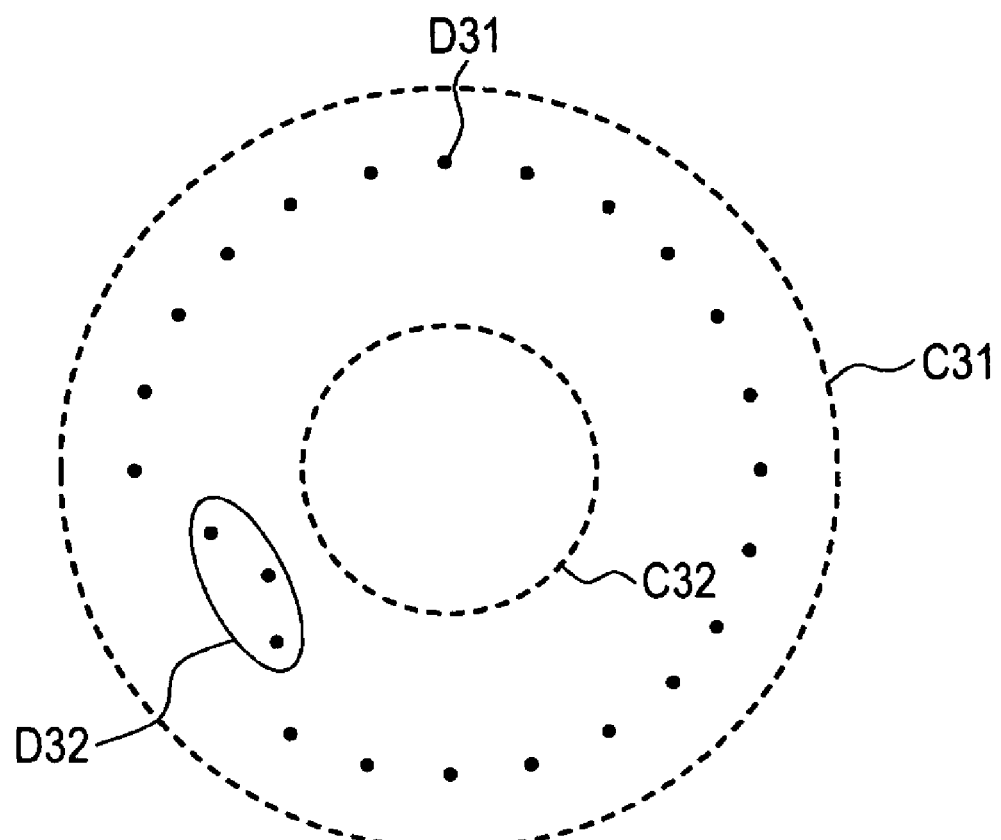
FIG. 16 is a drawing to show detection points D31 each identified for each segment in a circular region C31 as the processing target area.

FIG. 16 is a drawing to show detection points D31 each identified for each segment in a circular region C31 as the processing target area. In the example, some points D32 of the detection points D31 each for each sector region as the segment are shifted in position due to distortion of subject contours caused by the effect of disturbance, etc.

Figure 17:
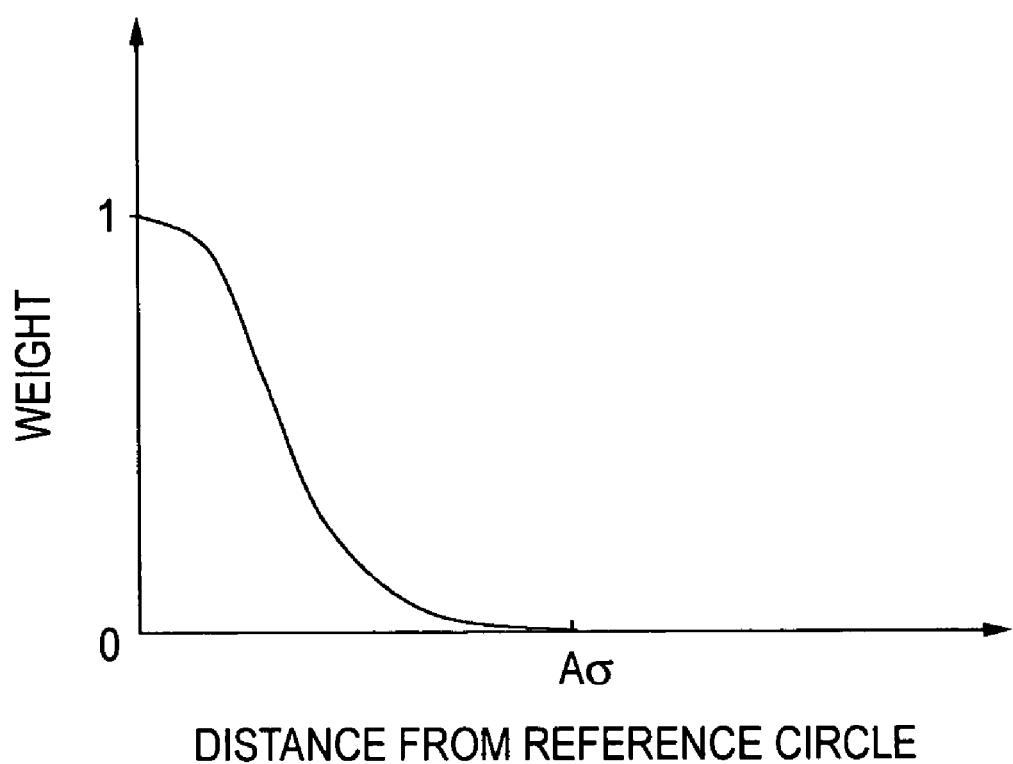
FIG. 17 is a drawing to show weight given to each detection point D31.
Figure 18:
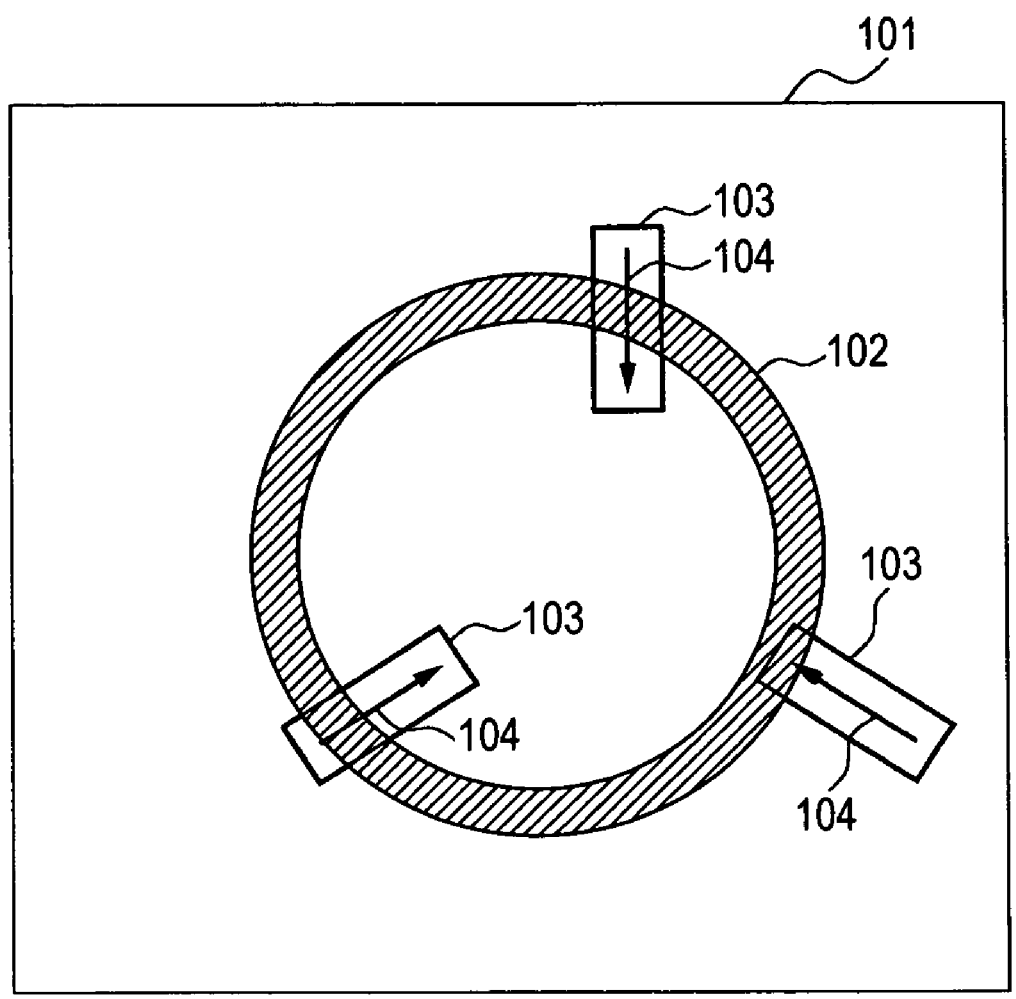
FIG. 18 is a drawing to show an operation example in image processing in a related art.

FIG. 17 is a drawing to show weight given to each detection point D31. The weight given to each detection point D31 is set to zero to the detection point with the distance from the reference circle being equal to or greater than Aσ to the detection point with the distance being less than Aσ, the smaller the distance, the larger is given the weight. The weight of the detection point with the distance from the reference circle becoming zero is set to the maximum value 1. According to the configuration, the contour circle is calculated based on the detection point group weighted in response to the distance from the reference circle, so that if distortion occurs in the photograph image of the subject because of the effect of disturbance, the contour circle can be determined correctly.

What is claimed is:

1. An image processing apparatus for detecting a contour circle as contours of a subject based on image data provided by an image acquiring unit, said image processing apparatus comprising:

a processing target area specification section for specifying a processing target area;

a circumferential direction specification section for specifying the circumferential direction of the contour circle in the processing target area;

an edge detection region specification section for specifying three or more regions made different in position in the circumferential direction in the processing target area as edge detection regions based on the processing target area and the circumferential direction;

an edge position identification section for identifying edge positions with respect to the radial direction of the contour circle based on the intensity distribution in the edge detection regions; and a contour circle determination section for determining the contour circle based on the edge positions identified relative to the edge detection regions.

2. The image processing apparatus as claimed in claim 1 wherein said contour circle determination section comprises:

a reference circle calculation section for defining a reference circle from the edge positions each for each of the edge detection regions based on a least squares method;

an edge position weighting section for weighting the edge positions each for each of the edge detection regions in response to the distance from the reference circle; and a contour circle calculation section for calculating the contour circle based on the weighted edge positions.

3. The image processing apparatus as claimed in claim 2 wherein said edge detection region specification section specifies edge detection regions overlapping each other.

4. The image processing apparatus as claimed in claim 2 wherein the processing target area is a circular region containing the contour circle and each of the edge detection regions is a sector region with the center of the circular region as the vertex.

5. The image processing apparatus as claimed in claim 2 wherein said processing target area specification section specifies an annular region sandwiched between two concentric circles different in diameter as the processing target area.

6. The image processing apparatus as claimed in claim 2 wherein the processing target area is a rectangular region not containing the center of the contour circle and containing one portion of the circumference of the contour circle.

7. The image processing apparatus as claimed in claim 1 wherein said edge detection region specification section specifies edge detection regions overlapping each other.

8. The image processing apparatus as claimed in claim 1 wherein the processing target area is a circular region containing the contour circle and each of the edge detection regions is a sector region with the center of the circular region as the vertex.

9. The image processing apparatus as claimed in claim 1 wherein said processing target area specification section specifies an annular region sandwiched between two concentric circles different in diameter as the processing target area.

10. The image processing apparatus as claimed in claim 1 wherein the processing target area is a rectangular region not containing the center of the contour circle and containing one portion of the circumference of the contour circle.

11. An image processing method for detecting a contour circle as contours of a subject based on image data provided by an image acquiring unit, said image processing method being performed by an image processing apparatus, and said image processing method comprising steps of:

specifying a processing target area;

specifying the circumferential direction of the contour circle in the processing target area;

specifying three or more regions made different in position in the circumferential direction in the processing target area as edge detection regions based on the processing target area and the circumferential direction;

identifying edge positions with respect to the radial direction of the contour circle; and determining the contour circle based on the edge positions identified relative to the edge detection regions.

12. The image processing method as claimed in claim 11 wherein said contour circle determination step comprises:

defining a reference circle from the edge positions each for each of the edge detection regions based on a least squares method;

weighting the edge positions each for each of the edge detection regions in response to the distance from the reference circle; and calculating the contour circle based on the weighted edge positions.

13. The image processing method as claimed in claim 11 wherein said edge detection region specification step specifies edge detection regions overlapping each other.

14. The image processing method as claimed in claim 11 wherein the processing target area is a circular region containing the contour circle and each of the edge detection regions is a sector region with the center of the circular region as the vertex.

15. The image processing method as claimed in claim 11 wherein said processing target area specification step specifies an annular region sandwiched between two concentric circles different in diameter as the processing target area.

16. The image processing method as claimed in claim 1 wherein the processing target area is a rectangular region not containing the center of the contour circle and containing one portion of the circumference of the contour circle.

* * * * *